United States Patent
Bai

(10) Patent No.: US 10,409,387 B2
(45) Date of Patent: Sep. 10, 2019

(54) METHOD FOR RECOMMENDING LOCK-SCREEN WALLPAPER AND RELATED PRODUCTS

(71) Applicant: Guangdong Oppo Mobile Telecommunications Corp., Ltd., Dongguan, Guangdong (CN)

(72) Inventor: Jian Bai, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 15/987,091

(22) Filed: May 23, 2018

(65) Prior Publication Data
US 2018/0373342 A1 Dec. 27, 2018

(30) Foreign Application Priority Data
Jun. 21, 2017 (CN) .......................... 2017 1 0475491

(51) Int. Cl.
*G06F 3/03* (2006.01)
*G06F 3/01* (2006.01)
(Continued)

(52) U.S. Cl.
CPC ............. *G06F 3/017* (2013.01); *G06F 3/011* (2013.01); *G06F 3/012* (2013.01); *G06F 3/0304* (2013.01);
(Continued)

(58) Field of Classification Search
CPC ...... G06F 3/017; G06F 3/0304; G06F 3/0484; G06F 9/451; G06F 16/436; G06F 21/32; G06K 9/00302; G06K 9/00308
See application file for complete search history.

(56) References Cited

U.S. PATENT DOCUMENTS 6,931,147 B2 * 8/2005 Colmenarez ....... H04N 1/00127
382/118
7,764,311 B2 * 7/2010 Bill .......................... G10H 1/00
348/222.1
(Continued)

FOREIGN PATENT DOCUMENTS

CN 1652545 A 8/2005
CN 102917120 A 2/2013
(Continued)

OTHER PUBLICATIONS

Extended European search report issued in corresponding European application No. 18171842.0 dated Sep. 27, 2018.
(Continued)

*Primary Examiner* — Dino Kujundzic
(74) *Attorney, Agent, or Firm* — Young Basile Hanlon & MacFarlane, P.C.

(57) ABSTRACT

A method for recommending a lock-screen wallpaper and related products are provided, and the method includes the follows. Whether a mobile terminal is in a preset lifting state is detected by a gesture sensor by the mobile terminal. A front-facing camera is activated and a first user-facial image is captured when the mobile terminal is in the preset lifting state. A first expression of the first user-facial image is analyzed and a first target lock-screen wallpaper type-set corresponding to the first expression is determined based on a correspondence between expressions and lock-screen wallpaper type-sets. A screen of the mobile terminal is lit up, a lock-screen interface is entered, and a first lock-screen wallpaper is displayed on the lock-screen interface. The first lock-screen wallpaper is one selected from the first target lock-screen wallpaper type-set.

20 Claims, 6 Drawing Sheets

(51) Int. Cl.
| | |
|---|---|
| *H04M 1/725* | (2006.01) |
| *G06K 9/00* | (2006.01) |
| *G06F 9/451* | (2018.01) |
| *G06F 3/0484* | (2013.01) |
| *G06F 21/32* | (2013.01) |
| *H04M 1/02* | (2006.01) |
| *G06F 16/435* | (2019.01) |
| *H04M 1/67* | (2006.01) |
| *G06F 3/0481* | (2013.01) |
| *G06F 3/0346* | (2013.01) |

(52) U.S. Cl.
CPC ............ *G06F 3/0484* (2013.01); *G06F 9/451* (2018.02); *G06F 16/436* (2019.01); *G06F 21/32* (2013.01); *G06K 9/00302* (2013.01); *G06K 9/00308* (2013.01); *G06K 9/00355* (2013.01); *H04M 1/0264* (2013.01); *H04M 1/72544* (2013.01); *G06F 3/0346* (2013.01); *G06F 3/0481* (2013.01); *G06F 2203/011* (2013.01); *H04M 1/67* (2013.01); *H04M 1/72569* (2013.01); *H04M 2201/42* (2013.01); *H04M 2250/52* (2013.01)

(56) References Cited

U.S. PATENT DOCUMENTS

| | | | | |
|---|---|---|---|---|
| 7,930,676 | B1* | 4/2011 | Thomas | G06F 9/44505 706/45 |
| 8,094,891 | B2* | 1/2012 | Andreasson | G11B 27/105 382/118 |
| 8,126,220 | B2* | 2/2012 | Greig | G06K 9/00315 382/118 |
| 8,847,884 | B2* | 9/2014 | Li | G06K 9/00 345/156 |
| 9,513,699 | B2* | 12/2016 | Jung | G06F 3/011 |
| 10,191,920 | B1* | 1/2019 | Grundmann | G06K 9/00302 |
| 2003/0108241 | A1 | 6/2003 | Colmenarez et al. | |
| 2007/0288898 | A1* | 12/2007 | Isberg | G06K 9/00335 717/124 |
| 2009/0002178 | A1* | 1/2009 | Guday | A61B 5/0002 340/573.1 |
| 2009/0110246 | A1* | 4/2009 | Olsson | H04M 1/72544 382/118 |
| 2011/0151934 | A1 | 6/2011 | Geng | |
| 2012/0013553 | A1 | 1/2012 | Kim et al. | |
| 2014/0171043 | A1 | 6/2014 | Gotzl et al. | |
| 2014/0210754 | A1* | 7/2014 | Ryu | G06F 3/017 345/173 |
| 2014/0323194 | A1* | 10/2014 | Keilwert | G07F 17/3206 463/16 |
| 2016/0225028 | A1* | 8/2016 | Rollert | G06Q 30/0267 |
| 2017/0060927 | A1* | 3/2017 | Cellier | G06F 16/23 |
| 2017/0150038 | A1* | 5/2017 | Papakipos | G06F 1/1686 |
| 2017/0280394 | A1* | 9/2017 | Kim | G06F 1/1694 |

FOREIGN PATENT DOCUMENTS

| | | |
|---|---|---|
| CN | 102946491 A | 2/2013 |
| CN | 103309449 A | 9/2013 |
| CN | 104158963 A | 11/2014 |
| CN | 104158964 A | 11/2014 |
| CN | 105242942 A | 1/2016 |
| CN | 106293392 A | 1/2017 |

OTHER PUBLICATIONS

International search report issued in corresponding international application No. PCT/CN2018/085904 dated Aug. 6, 2018.

* cited by examiner

METHOD FOR RECOMMENDING LOCK-SCREEN WALLPAPER AND RELATED PRODUCTS

CROSS-REFERENCE TO RELATED APPLICATION(S)

This application claims priority to Chinese Patent Application No. 201710475491.9, filed on Jun. 21, 2017, the disclosure of which is hereby incorporated by reference in its entirety.

TECHNICAL FIELD

The present disclosure relates to the field of mobile communication technology, and particularly to a method for recommending a lock-screen wallpaper and related products.

BACKGROUND

With the increasing use of mobile terminals such as smartphones, currently, almost every person has a mobile phone, and mobile phones have become an indispensable part of people's lives and work. In order to enrich a display effect of a lock-screen interface of the mobile terminal, a system or some lock-screen magazine-type applications of the mobile terminal can provide users with a rich lock-screen wallpaper library. Current lock-screen wallpaper display adopts a random carousel manner. Each time the user locks the screen, a picture is selected randomly from the lock-screen wallpaper library as a wallpaper.

If the picture randomly selected from the lock-screen wallpaper library is not what the user likes, the user needs to delete and modify the picture in a directory stored in the lock-screen wallpaper library, the operation is complicated and user experience is poor.

SUMMARY

Implementations of the present disclosure provide a method for recommending a lock-screen wallpaper and related products, so as to recommend a wallpaper matching a user's expression for a user on a lock-screen interface and improve user experience.

According to a first aspect of the implementations of the present disclosure, there is provided a method for recommending a lock-screen wallpaper. The method can include the follows.

Whether a mobile terminal is in a preset lifting state is detected by a gesture sensor. A front-facing camera is activated and a first user-facial image is captured when the mobile terminal is in the preset lifting state. A first expression of the first user-facial image is analyzed and a first target lock-screen wallpaper type-set corresponding to the first expression is determined based on a correspondence between expressions and lock-screen wallpaper type-sets. A screen of the mobile terminal is lit up, a lock-screen interface is entered, and a first lock-screen wallpaper is displayed on the lock-screen interface. The first lock-screen wallpaper is one selected from the first target lock-screen wallpaper type-set.

According to a second aspect of the implementations of the present disclosure, there is provided a mobile terminal. The mobile terminal includes a detecting unit, a capturing unit, an analyzing unit, a determining unit, and a displaying unit.

The detecting unit is configured to detect, by a gesture sensor, whether the mobile terminal is in a preset lifting state.

The capturing unit is configured to activate a front-facing camera and capture a first user-facial image when the detecting unit detects that the mobile terminal is in the preset lifting state.

The analyzing unit is configured to analyze a first expression of the first user-facial image.

The determining unit is configured to determine a first target lock-screen wallpaper type-set corresponding to the first expression based on a correspondence between expressions and lock-screen wallpaper type-sets.

The displaying unit is configured to light up a screen of the mobile terminal, enter a lock-screen interface, and display a first lock-screen wallpaper on the lock-screen interface. The first lock-screen wallpaper is one selected from the first target lock-screen wallpaper type-set.

According to a third aspect of the implementations of the present disclosure, there is provided a mobile terminal. The mobile terminal includes one or more processors, a memory, a communication unit, and one or more programs.

The one or more programs are stored in the memory and include instructions that when executed, become operable with the one or more processors to perform all or part of operations of any method according to the first aspect of implementations of the present disclosure.

According to a fourth aspect of implementations of the present disclosure, there is provided a non-volatile computer readable storage medium storing computer programs configured for electronic data interchange. The computer programs, when executed, become operable with a computer to perform all or part of operations of any method according to the first aspect of the implementations of the present disclosure.

According to a fifth aspect of implementations of the present disclosure, there is provided a computer program product. The computer program product includes a non-transitory computer readable storage medium for storing computer programs. The computer programs, when executed, are operable with a computer to perform all or part of operations of any method according to the first aspect of the implementations of the present disclosure.

BRIEF DESCRIPTION OF THE DRAWINGS

In order to illustrate the technical solutions of implementations of the present disclosure more clearly, the drawings used in the implementations will be briefly described below. It will be apparent that the drawings described in the following are merely some implementations of the present disclosure, and it will be apparent to those skilled in the art that other drawings can be obtained from the drawings without any creative work.

DETAILED DESCRIPTION

Figure 1:
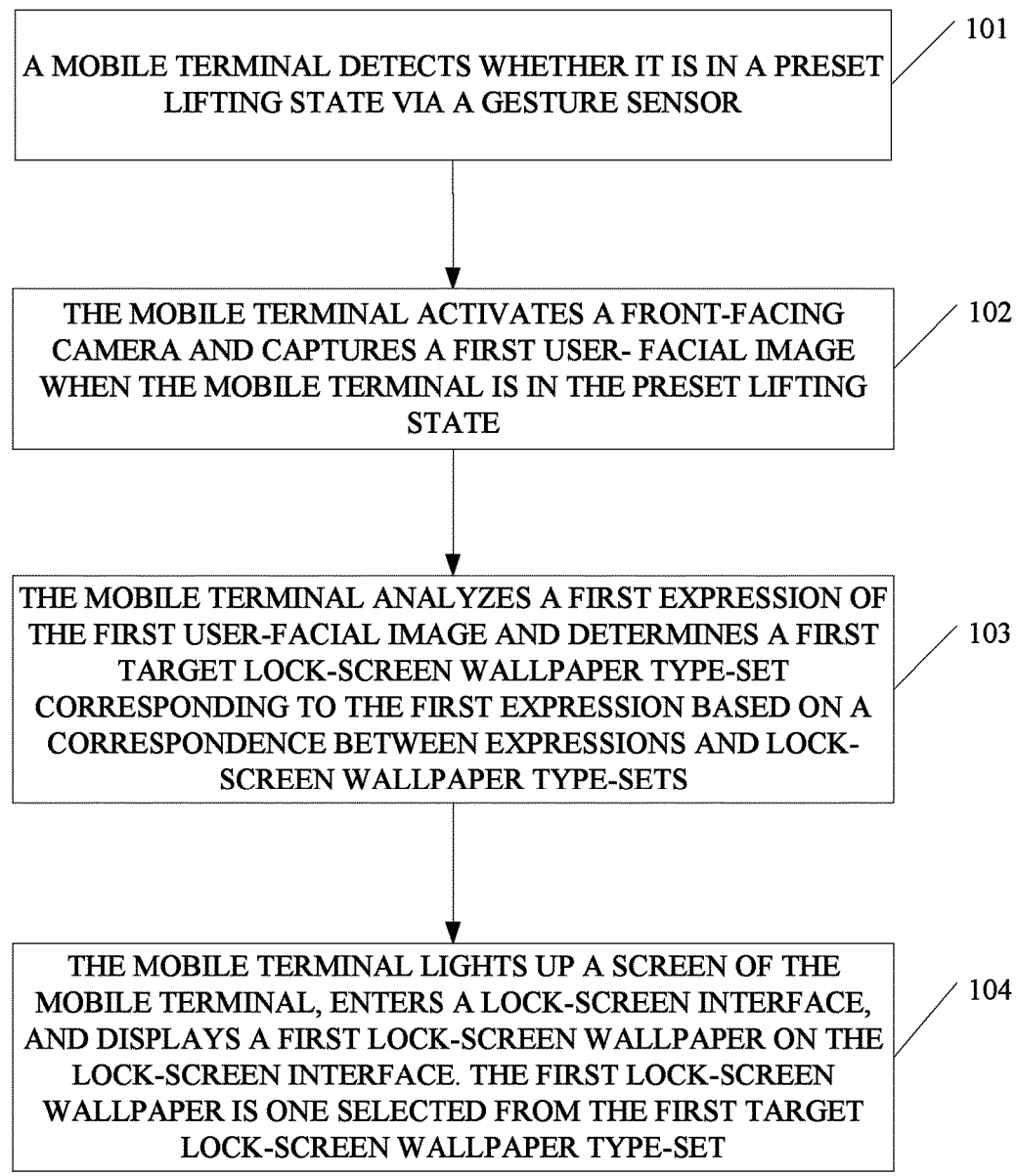
FIG. 1 is a schematic flow chart diagram illustrating a method for recommending a lock-screen wallpaper according to an implementation of the present disclosure.

Technical solutions of the present disclosure will be described clearly and completely with reference to the accompanying drawings; obviously, the implementations described below are merely part of rather than all of the implementations of the present disclosure. Based on the implementations of the present disclosure, other implementations obtained therefrom without any creative work by those of ordinary skill in the art shall fall into the protection scope of the present disclosure.

The terms "first", "second" and the like in the specification and claims of the present disclosure and the drawings are used for distinguishing different objects rather than describing a specific order. In addition, terms of "including" and "having" and any inflections thereof are intended to cover a non-exclusive inclusions relationship. For example, processes, methods, systems, products or devices containing a series of operations or units are not limited to listed processes or units, other processes or units which are not listed can also be included, or other processes or units inherent to these processes, methods, products or devices can also be included.

The term "implementation" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The mobile terminal involved in the implementations of the present disclosure may include various handheld devices having wireless communication functions, in-vehicle devices, wearable devices, computing devices or other processing devices connected to the wireless modem, as well as various forms of user equipment (UE), mobile stations (MS), terminal devices, and the like. For the convenience of description, the above-mentioned devices are collectively referred to as a mobile terminal.

The "positive expression" involved in the implementations of the present disclosure may refer to expressions that individuals produce due to internal or external stimuli, or events that satisfy individual needs, accompanied by pleasant feelings, such as happy, pleased, content, interested, proud, grateful, and the like.

The "negative expression involved in the implementations of the present disclosure may refer to expressions which are caused by external factors or internal factors and not conducive to continuing working or thinking normally. It is opposite to positive expression. The negative expression may include: sad, angry, tension, anxious, painful, scared, hateful, etc.

According to a first aspect of the implementations of the present disclosure, there is provided a method for recommending a lock-screen wallpaper. The method includes: detecting, by a gesture sensor, whether a mobile terminal is in a preset lifting state; activating a front-facing camera and capturing a first user-facial image when the mobile terminal is in the preset lifting state; analyzing a first expression of the first user-facial image and determining a first target lock-screen wallpaper type-set corresponding to the first expression based on a correspondence between expressions and lock-screen wallpaper type-sets; lighting up a screen of the mobile terminal, entering a lock-screen interface, and displaying a first lock-screen wallpaper on the lock-screen interface. The first lock-screen wallpaper is one selected from the first target lock-screen wallpaper type-set.

In one implementation, the method further includes the follows after the displaying a first lock-screen wallpaper on the lock-screen interface: capturing a second user-facial image by the front-facing camera; analyzing a second expression of the second user-facial image; judging whether the second expression is the same as the first expression; switching the first lock-screen wallpaper displayed on the lock-screen interface to a second lock-screen wallpaper, when the second expression is different from the first expression and the first expression is a positive expression while the second expression is a negative expression.

In one implementation, the second lock-screen wallpaper is one selected from a second target lock-screen wallpaper type-set corresponding to the second expression.

In one implementation, the second lock-screen wallpaper is one selected from the first target lock-screen wallpaper type-set except the first lock-screen wallpaper.

In one implementation, the method further includes the follows after the switching the first lock-screen wallpaper displayed on the lock-screen interface to a second lock-screen wallpaper: deleting the first lock-screen wallpaper from the first target lock-screen wallpaper type-set.

In one implementation, the method further includes: adding the first lock-screen wallpaper to favorites, when the second expression is different from the first expression and the first expression is the negative expression while the second expression is the positive expression.

In one implementation, the method further includes: switching the first lock-screen wallpaper displayed on the lock-screen interface to a third lock-screen wallpaper, when the second expression is the same as the first expression and both the first expression and the second expression are negative expressions. The third lock-screen wallpaper is any one collected in favorites.

In one implementation, the method further includes: remaining displaying the first lock-screen wallpaper on the lock-screen interface, when the second expression is the same as the first expression and both the first expression and the second expression are positive expressions.

In one implementation, the method further includes the follows after the displaying a first lock-screen wallpaper on the lock-screen interface: entering a reading interface of the first lock-screen wallpaper when detecting a reading instruction for the first lock-screen wallpaper; counting a reading duration of the first lock-screen wallpaper; adding the first lock-screen wallpaper to favorites when the reading duration reaches a preset time period.

According to a second aspect of the implementations of the present disclosure, there is provided a mobile terminal. The mobile terminal includes a detecting unit, a capturing unit, an analyzing unit, a determining unit, and a displaying unit.

The detecting unit is configured to detect, by a gesture sensor, whether the mobile terminal is in a preset lifting state.

The capturing unit is configured to activate a front-facing camera and capture a first user-facial image when the detecting unit detects that the mobile terminal is in the preset lifting state.

The analyzing unit is configured to analyze a first expression of the first user-facial image.

The determining unit is configured to determine a first target lock-screen wallpaper type-set corresponding to the first expression based on a correspondence between expressions and lock-screen wallpaper type-sets.

The displaying unit is configured to light up a screen of the mobile terminal, enter a lock-screen interface, and display a first lock-screen wallpaper on the lock-screen interface. The first lock-screen wallpaper is one selected from the first target lock-screen wallpaper type-set.

In one implementation, the capturing unit is further configured to capture a second user-facial image by the front-facing camera after the first lock-screen wallpaper is displayed on the lock-screen interface by the displaying unit. The analyzing unit is further configured to analyze a second expression of the second user-facial image. The mobile terminal further includes: a judging unit, configured to judge whether the second expression is the same as the first expression; a switching unit, configured to switch the first lock-screen wallpaper displayed on the lock-screen interface to a second lock-screen wallpaper, when the second expression is different from the first expression and the first expression is a positive expression while the second expression is a negative expression.

In one implementation, the second lock-screen wallpaper is one selected from a second target lock-screen wallpaper type-set corresponding to the second expression.

In one implementation, the second lock-screen wallpaper is one selected from the first target lock-screen wallpaper type-set except the first lock-screen wallpaper.

In one implementation, the mobile terminal further includes: a deleting unit, configured to delete the first lock-screen wallpaper from the first target lock-screen wallpaper type-set after the first lock-screen wallpaper displayed on the lock-screen interface is switched to the second lock-screen wallpaper by the switching unit.

In one implementation, the mobile terminal further includes: a first adding unit, configured to add the first lock-screen wallpaper to favorites, when the second expression is different from the first expression and the first expression is the negative expression while the second expression is the positive expression.

In one implementation, the switching unit is further configured to switch the first lock-screen wallpaper displayed on the lock-screen interface to a third lock-screen wallpaper, when the second expression is the same as the first expression and both the first expression and the second expression are negative expressions. The third lock-screen wallpaper is any one collected in favorites.

In one implementation, the displaying unit is further configured to remain displaying the first lock-screen wallpaper on the lock-screen interface, when the second expression is the same as the first expression and both the first expression and the second expression are positive expressions.

In one implementation, the mobile terminal further includes: a counting unit, configured to enter a reading interface of the first lock-screen wallpaper when detecting a reading instruction for the first lock-screen wallpaper, and count a reading duration of the first lock-screen wallpaper; a second adding unit, configured to add the first lock-screen wallpaper to favorites when the reading duration reaches a preset time period.

According to a third aspect of the implementations of the present disclosure, there is provided a mobile terminal. The mobile terminal includes one or more processors, a memory, a communication unit, and one or more programs.

The one or more programs are stored in the memory and include instructions that when executed, become operable with the one or more processors to: detect, by a gesture sensor, whether a mobile terminal is in a preset lifting state; activate a front-facing camera and capturing a first user-facial image when the mobile terminal is in the preset lifting state; analyze a first expression of the first user-facial image and determining a first target lock-screen wallpaper type-set corresponding to the first expression based on a correspondence between expressions and lock-screen wallpaper type-sets; light up a screen of the mobile terminal, enter a lock-screen interface, and display a first lock-screen wallpaper on the lock-screen interface. The first lock-screen wallpaper is one selected from the first target lock-screen wallpaper type-set.

In one implementation, the instructions that when executed, are further operable with the one or more processors to: capture a second user-facial image by the front-facing camera; analyze a second expression of the second user-facial image; judge whether the second expression is the same as the first expression; switch the first lock-screen wallpaper displayed on the lock-screen interface to a second lock-screen wallpaper, when the second expression is different from the first expression and the first expression is a positive expression while the second expression is a negative expression.

In one implementation, the second lock-screen wallpaper is one selected from a second target lock-screen wallpaper type-set corresponding to the second expression.

In one implementation, the second lock-screen wallpaper is one selected from the first target lock-screen wallpaper type-set except the first lock-screen wallpaper.

In one implementation, the instructions that when executed, are further operable with the one or more processors to: delete the first lock-screen wallpaper from the first target lock-screen wallpaper type-set.

In one implementation, the instructions that when executed, are further operable with the one or more processors to: add the first lock-screen wallpaper to favorites, when the second expression is different from the first expression and the first expression is the negative expression while the second expression is the positive expression.

In one implementation, the instructions that when executed, are further operable with the one or more processors to: switch the first lock-screen wallpaper displayed on the lock-screen interface to a third lock-screen wallpaper, when the second expression is the same as the first expression and both the first expression and the second expression are negative expressions. The third lock-screen wallpaper is any one collected in favorites.

In one implementation, the instructions that when executed, are further operable with the one or more processors to: remain displaying the first lock-screen wallpaper on the lock-screen interface, when the second expression is the same as the first expression and both the first expression and the second expression are positive expressions.

In one implementation, the instructions that when executed, are further operable with the one or more processors to: enter a reading interface of the first lock-screen wallpaper when detecting a reading instruction for the first lock-screen wallpaper; count a reading duration of the first lock-screen wallpaper; and add the first lock-screen wallpaper to favorites when the reading duration reaches a preset time period.

According to a fourth aspect of implementations of the present disclosure, there is provided a non-volatile computer readable storage medium storing computer programs configured for electronic data interchange. The computer programs, when executed, become operable with a computer to perform all or part of operations of any method according to the first aspect of the implementations of the present disclosure.

According to a fifth aspect of implementations of the present disclosure, there is provided a computer program product. The computer program product includes a non-transitory computer readable storage medium for storing computer programs. The computer programs, when executed, are operable with a computer to perform all or part of operations of any method according to the first aspect of the implementations of the present disclosure.

In the method for recommending a lock-screen wallpaper of the implementations of the present disclosure, when a user's action of lifting a mobile terminal is detected (that is, before a screen of the mobile terminal is lit up), a user-facial image is captured, an expression of the user-facial image is analyzed, and then a lock-screen wallpaper type-set corresponding to the expression of the user-facial image is determined. After the screen of the mobile terminal is lit up, enter a lock-screen interface on which a wallpaper, from the lock-screen wallpaper type-set corresponding to the expression of the user-facial image, is recommended to the user. By means of the implementations of the present disclosure, a wallpaper matching a user's expression can be recommended for the user on the lock-screen interface when the user lifts the mobile terminal, so as to improve user experience.

Implementations of the present disclosure will be described with reference to the accompanying drawings in the following.

Referring to FIG. 1, FIG. 1 is a schematic flow chart diagram illustrating a method for recommending a lock-screen wallpaper according to an implementation of the present disclosure. As illustrated in FIG. 1, the method for recommending a lock-screen wallpaper starts with operations at block 101.

At block 101, a mobile terminal detects whether it is in a preset lifting state via a gesture sensor.

In the implementation of present disclosure, the gesture sensor is a high-performance three-dimensional motion gesture measuring system based on microelectromechanical system (MEMS) technology. The gesture sensor can be a three-axis gyroscope, a three-axis accelerometer, a gravity sensor, a three-axis electronic compass, and other motion sensors. The gesture sensor is configured to detect a motion state of the mobile terminal. An angular velocity of the mobile terminal can be detected by the three-axis gyroscope, a linear acceleration of the mobile terminal can be measured by the three-axis accelerometer, and an angle of the mobile terminal relative to the horizontal plane can be measured by the gravity sensor. The preset lifting state is a possible motion state of the mobile terminal. A condition satisfying the preset lifting state is: within a preset time period (for example, within 0.5 seconds), a change of the angle of the mobile terminal relative to the horizontal plane exceeds a preset angle, an instantaneous angular velocity of the mobile terminal is greater than a preset angular velocity threshold, and an instantaneous linear velocity of the mobile terminal is greater than a preset linear velocity threshold. One exemplary condition satisfying the preset lifting state is: within 0.5 seconds, the change of the angle of the mobile terminal relative to the horizontal plane exceeds 60 degrees, the instantaneous angular velocity of the mobile terminal is greater than 3 radians per second (3 rad/s), and the instantaneous linear velocity of the mobile terminal is greater than 0.1 meters per second (0.1 m/s).

In a specific scenario, detecting whether the mobile terminal is in the preset lifting state means detecting whether the user has lifted the mobile terminal. Specifically, use a mobile phone as an example of the mobile terminal. At the beginning, the mobile phone is in a black-screen standby state, but the gesture sensor is still working in a background. When it is detected that within a preset period of time (for example, within 0.5 seconds), the change of the angle of the mobile terminal relative to the horizontal plane exceeds the preset angle, the instantaneous angular velocity of the mobile terminal is greater than a preset angular velocity threshold, and then instantaneous linear velocity of the mobile terminal is greater than a preset linear velocity threshold, it can be determined that the mobile terminal is in the preset lifting state, and it can be considered that the user is picking up the mobile phone.

At block 102, the mobile terminal activates a front-facing camera and captures a first user-facial image when the mobile terminal is in the preset lifting state.

In the implementation of the present disclosure, when it is detected that the mobile terminal is in the preset lifting state, it can be considered that the user is picking up the mobile terminal and tends to unlock a screen of the mobile terminal. In order to allow the user to enter the lock-screen interface of the mobile terminal quickly, the screen will be lit up (in other words, screen-on) automatically and a lock-screen interface will be entered. In the implementation of the present disclosure, before the screen is lit up by the mobile terminal, the front-facing camera is activated and the first user-facial image is captured. The first user-facial image can be one clear image containing a user's face selected from a plurality of images continuously captured by the front-facing camera. The first user-facial image can be also one clear image containing the user's face synthesized according to a plurality of images continuously captured by the front-facing camera (for example, synthesized through multi-frame noise reduction).

At block 103, the mobile terminal analyzes a first expression of the first user-facial image and determines a first target lock-screen wallpaper type-set corresponding to the first expression based on a correspondence between expressions and lock-screen wallpaper type-sets.

In this implementation of the present disclosure, after the first user-facial image is captured by the front-facing camera, the first user-facial image can be analyzed by the mobile terminal, to obtain a user's expression of the first user-facial image and record the user's expression of the first user-facial image as the first expression. The first user-facial image can be analyzed as follows: facial features such as eyes, nose, face, and mouth in the first user-facial image can be extracted through an image processing method by the mobile terminal. The extracted facial features are compared with user's expressions in a user-expression library. A user's expression having the highest matching degree in the user-expression library is regarded as the first expression of the first user-facial image. The user-expression library contains a plurality of user's expressions of the user collected in advance. The user's expressions can be "excited", "happy", "frustrated", "angry", and the like.

The correspondence between expressions and lock-screen wallpaper type-sets can be pre-stored in a non-transitory memory of the mobile terminal. The correspondence between expressions and lock-screen wallpaper type-sets can be stored as a table. Each expression corresponds to a kind of lock-screen wallpaper type-set. Each lock-screen wallpaper type-set can include a plurality of lock-screen wallpapers of the same type. For example, the expression "anger" corresponds to warm-type wallpapers, the expression "frustrated" corresponds to inspirational-type wallpapers (e.g., inspirational portraits), and the expression "happy" corresponds to landscape-type wallpapers.

At block 104, the mobile terminal lights up a screen of the mobile terminal, enters a lock-screen interface, and displays a first lock-screen wallpaper on the lock-screen interface. The first lock-screen wallpaper is one selected from the first target lock-screen wallpaper type-set.

In this implementation of the present disclosure, after the first target lock-screen wallpaper type-set corresponding to the first expression is determined, the mobile terminal lights up the screen, enters the lock-screen interface, and selects a wallpaper randomly from the first target lock-screen wallpaper type-set to display the wallpaper selected on the lock-screen interface.

It should be noted that, the lock-screen wallpaper mentioned in the implementation of the present disclosure may be a static image or a GIF (graphics interchange format), for example, a short animation or video. In addition to static pictures or GIFs, the lock-screen wallpaper can also include comments on the static pictures or GIFs, through which the user can further understand a meaning conveyed by the lock-screen wallpaper and product information related to the lock-screen wallpaper. For example, when the lock-screen wallpaper is a picture of food (for example, a picture of crayfish), information on the food such as an ordering site, a business contact phone number, the weight, the price, and the taste of the food, and the like may be recommended.

In this implementation of the present disclosure, when a user's action of lifting a mobile terminal is detected, a user-facial image is captured and an expression of the user-facial image is analyzed, then a lock-screen wallpaper type-set corresponding to the expression of the user-facial image is determined, and ultimately, a lock-screen interface is entered after a screen of the mobile terminal is lit up and a wallpaper in the lock-screen wallpaper type-set corresponding to the expression of the user-facial image is displayed on the lock-screen interface. By means of the implementations of the present disclosure, a wallpaper matching a user's expression can be recommended for the user on the lock-screen interface when the user lifts the mobile terminal, so as to improve user experience.

Furthermore, after a wallpaper matching a user's expression is recommended for the user on the lock-screen interface when the user lifts the mobile terminal as illustrated in FIG. 1, the mobile terminal can further switch the wallpaper matching the user's expression but not matching the user's preferences to another wallpaper, which will be described in detail with reference to FIG. 2.

Figure 2:
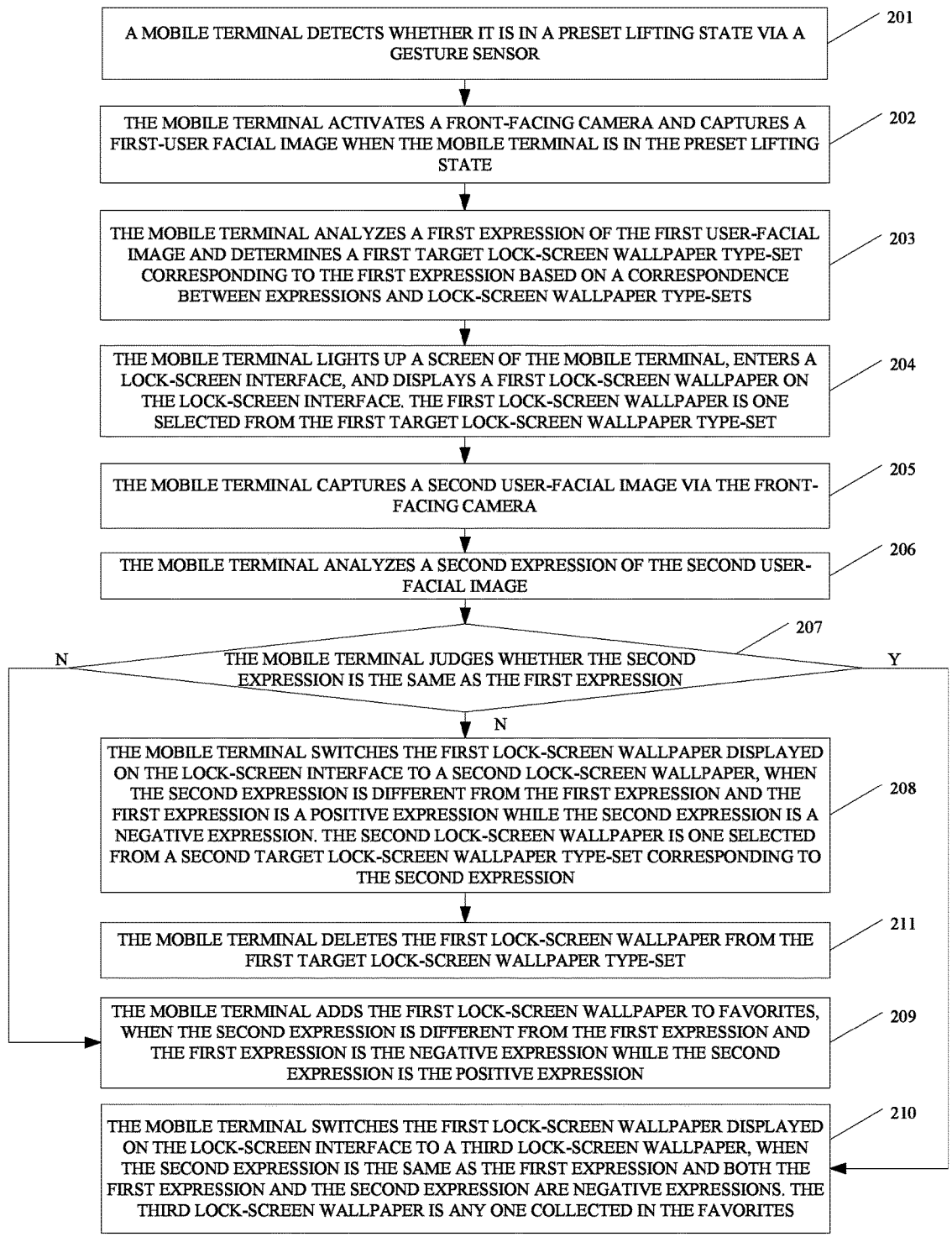
FIG. 2 is a schematic flow chart diagram illustrating another method for recommending a lock-screen wallpaper according to an implementation of the present disclosure.

Referring to FIG. 2, FIG. 2 is a schematic flow chart diagram illustrating another method for recommending a lock-screen wallpaper according to an implementation of the present disclosure. As illustrated in FIG. 2, the method for recommending a lock-screen wallpaper starts with operations at block 201.

At block 201, a mobile terminal detects whether it is in a preset lifting state via a gesture sensor.

At block 202, the mobile terminal activates a front-facing camera and captures a first user-facial image when the mobile terminal is in the preset lifting state.

At block 203, the mobile terminal analyzes a first expression of the first user-facial image and determines a first target lock-screen wallpaper type-set corresponding to the first expression based on a correspondence between expressions and lock-screen wallpaper type-sets.

At block 204, the mobile terminal lights up a screen of the mobile terminal, enters a lock-screen interface, and displays a first lock-screen wallpaper on the lock-screen interface. The first lock-screen wallpaper is one selected from the first target lock-screen wallpaper type-set.

At block 205, the mobile terminal captures a second user-facial image via the front-facing camera.

At block 206, the mobile terminal analyzes a second expression of the second user-facial image.

At block 207, the mobile terminal judges whether the second expression is the same as the first expression.

At block 208, the mobile terminal switches the first lock-screen wallpaper displayed on the lock-screen interface to a second lock-screen wallpaper, when the second expression is different from the first expression and the first expression is a positive expression while the second expression is a negative expression. The second lock-screen wallpaper is one selected from a second target lock-screen wallpaper type-set corresponding to the second expression.

In this implementation of the present disclosure, after the first lock-screen wallpaper is displayed on the lock-screen interface, the mobile terminal captures the second user-facial image via the front-facing camera. In this implementation of the present disclosure, the first user-facial image is captured by the front-facing camera when it is detected that the mobile terminal is in the preset lifting state, and the second user-facial image is captured by the front-facing camera after the first lock-screen wallpaper is displayed on the lock-screen interface by the mobile terminal. The front-facing camera captures user-facial images twice so as to compare whether expressions of the user-facial images captured twice have changed. Similar to the first user-facial image, the second user-facial image can be one clear image containing a user's face selected from a plurality of images continuously captured by the front-facing camera. The second user-facial image can be also one clear image containing the user's face synthesized according to a plurality of images continuously captured by the front-facing camera (for example, synthesized through multi-frame noise reduction).

After the second user-facial image is captured via the front-facing camera, the mobile terminal can analyze the second user-facial image, to obtain a user's expression of the second user-facial image and record the user's expression of the second user-facial image as the second expression. The manner in which the mobile terminal analyzes the second expression of the second user-facial image can be referred to descriptions of block 103 illustrated in FIG. 1, which will not be described in detail again.

The mobile terminal judges whether the second expression is the same as the first expression in order to compare whether expressions have changed before the user views the first lock-screen wallpaper displayed on the lock-screen interface and after the user views the first lock-screen wallpaper displayed on the lock-screen interface. If the expressions have changed, it indicates that the first lock-screen wallpaper has changed the user's mood. When the second expression is different from the first expression and the first expression is a positive expression while the second expression is a negative expression, it indicates that the user's mood is deteriorated, that is, the user may not like the first lock-screen wallpaper. The mobile terminal will switch the first lock-screen wallpaper displayed on the lock-screen interface to the second lock-screen wallpaper. The second lock-screen wallpaper is any one selected from the second target lock-screen wallpaper type-set corresponding to the second expression. The positive expression here can be expressions of good mood or good state such as "excited", "happy", and the negative expression here can be expressions of bad mood such as "bad", "anger".

In one implementation, the method illustrated in FIG. 2 can further include operations at block 209.

At block 209, the mobile terminal adds the first lock-screen wallpaper to favorites, when the second expression is different from the first expression and the first expression is the negative expression while the second expression is the positive expression.

When the first expression is the negative expression and the second expression is the positive expression, it indicates that the user feels better after viewing the first lock-screen wallpaper. The mobile terminal adds the first lock-screen wallpaper to the favorites. Lock-screen wallpapers collected in the favorites are all lock-screen wallpapers that the user likes, and a wallpaper can be selected from the favorites to be recommended to the user subsequently. By means of the implementation of the present disclosure, whether the user likes the wallpaper displayed on the lock-screen interface can be recognized intelligently through the change of the user's expressions, so as to recommend a user's favorite wallpaper for the user and improve the user experience.

In one implementation, the method illustrated in FIG. 2 can further include operations at block 210.

At block 210, the mobile terminal switches the first lock-screen wallpaper displayed on the lock-screen interface to a third lock-screen wallpaper, when the second expression is the same as the first expression and both the first expression and the second expression are negative expressions. The third lock-screen wallpaper is any one collected in the favorites.

When the second expression is the same as the first expression and both the first expression and the second expression are negative expressions, it indicates that the mood of the user has not been improved after viewing the first lock-screen wallpaper. Here, the first lock-screen wallpaper displayed on the lock-screen interface is switched to a third lock-screen wallpaper. The third lock-screen wallpaper is any one collected in the favorites. Lock-screen wallpapers collected in the favorites are those that the user likes. By means of the implementation of the present disclosure, when recognizing that the first lock-screen wallpaper cannot improve the user's mood, a wallpaper can be selected randomly from the favorites to replace the first lock-screen wallpaper, so as to improve the user's mood and improve the user experience.

In one implementation, when the second expression is the same as the first expression and both the first expression and the second expression are positive expressions, it indicates that the user still feels good after viewing the first lock-screen wallpaper. The first lock-screen wallpaper will remain displayed on the lock-screen interface and lock-screen wallpaper switching will not be performed.

In one implementation, operations at block 211 can be further performed after the operations at block 208.

At block 211, the mobile terminal deletes the first lock-screen wallpaper from the first target lock-screen wallpaper type-set.

When the first expression is the positive expression and the second expression is the negative expression, it indicates the user's mood is deteriorated after viewing the first lock-screen wallpaper and the user may not like the first lock-screen wallpaper, and then the operations at block 211 can be performed. The first lock-screen wallpaper that the user does not like is deleted from the first target lock-screen wallpaper type-set. The first lock-screen wallpaper will no longer be displayed on the lock-screen interface to the user afterward. By means of the implementation of the present disclosure, lock-screen wallpapers that the user does not like can be recognized and further deleted through the change of user's expressions. By recognizing a user label, the lock-screen wallpaper that the user does not like can be recognized intelligently, lock-screen wallpaper preferences of the user can be obtained, and the user experience can be improved.

In one implementation, operations at block 208 can be replaced with the following operations.

The first lock-screen wallpaper displayed on the lock-screen interface is switched to a second lock-screen wallpaper, when the second expression is different from the first expression and the first expression is the positive expression while the second expression is the negative expression. The second lock-screen wallpaper is one selected from the first target lock-screen wallpaper type-set except the first lock-screen wallpaper.

When detecting that the user does not like the first lock-screen wallpaper displayed on the lock-screen interface, the first lock-screen wallpaper displayed on the lock-screen interface is switched to one selected from the first target lock-screen wallpaper type-set except the first lock-screen wallpaper. In the implementation of the present disclosure, when detecting that the user does not like the first lock-screen wallpaper, other wallpapers in the first target lock-screen wallpaper type-set will be still recommended to the user.

Operations at block 201 to block 204 in the implementation illustrated in FIG. 2 may refer to operations at block 101 to block 104 illustrated in FIG. 1, which will not be described in detail herein again.

By means of the method illustrated in FIG. 2, when the mobile terminal is lifted by the user, the first expression of the user is detected, the first lock-screen wallpaper corresponding to the first expression is recommended on the lock-screen interface to the user. When detecting that the user does not like the first lock-screen wallpaper displayed on the lock-screen interface, that is, when the user's expression changes from the positive first expression to the negative second expression, the first lock-screen wallpaper displayed on the lock-screen interface is switched to a second lock-screen wallpaper corresponding to the second expression, so as to recommend a lock-screen wallpaper that matches the user's current mood and improve the user experience.

Furthermore, after a wallpaper matching a user's expression is recommended for the user on the lock-screen interface when the user lifts the mobile terminal as illustrated in FIG. 1, the mobile terminal can further collect the wallpaper to favorites of the mobile terminal, which will be described in detail with reference to FIG. 3.

Figure 3:
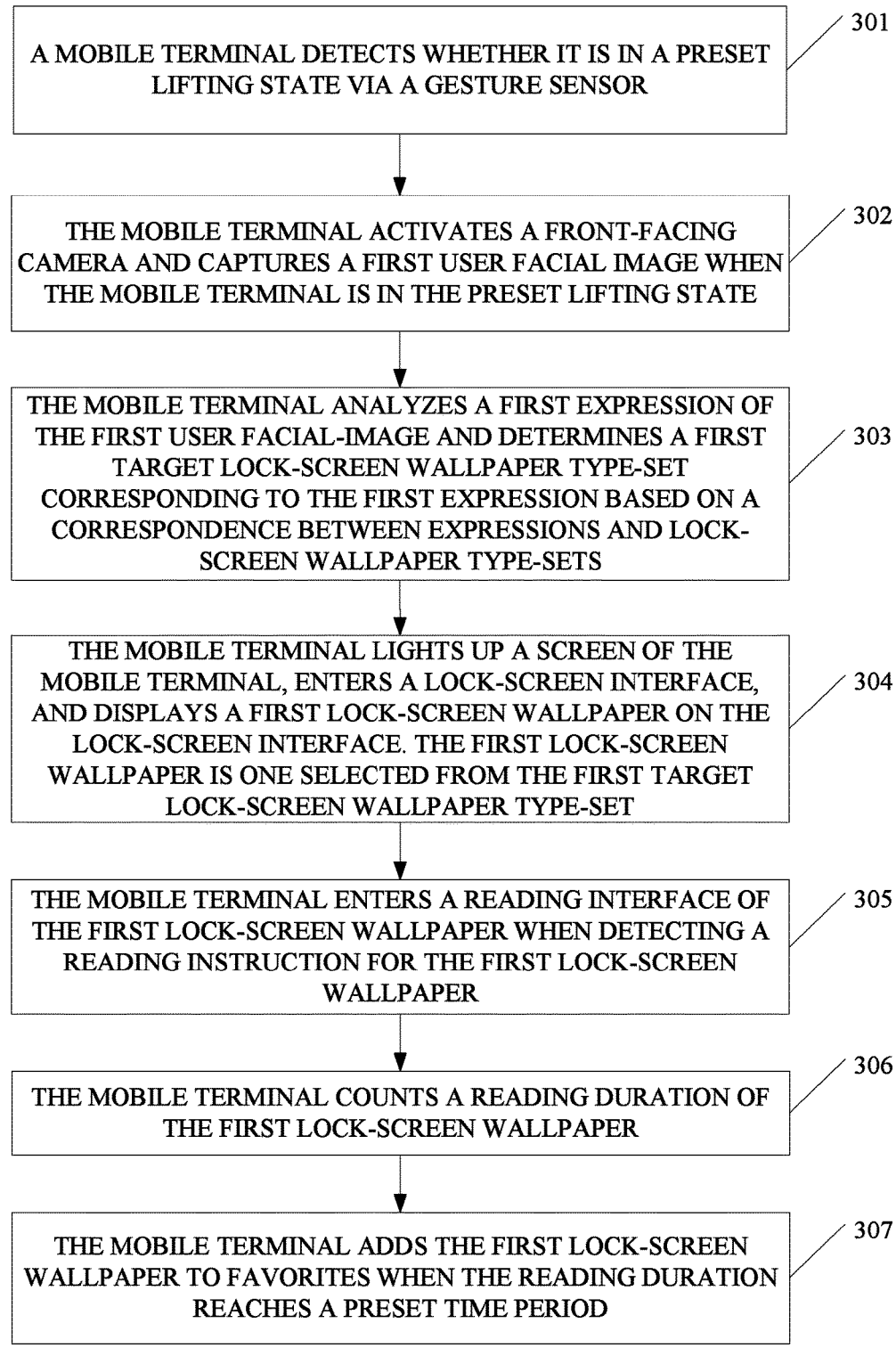
FIG. 3 is a schematic flow chart diagram illustrating another method for recommending a lock-screen wallpaper according to an implementation of the present disclosure.

Referring to FIG. 3, FIG. 3 is a schematic flow chart diagram illustrating another method for recommending a lock-screen wallpaper according to an implementation of the present disclosure. As illustrated in FIG. 3, the method for recommending a lock-screen wallpaper starts with operations at block 301.

At block 301, a mobile terminal detects whether it is in a preset lifting state via a gesture sensor.

At block 302, the mobile terminal activates a front-facing camera and captures a first user-facial image when the mobile terminal is in the preset lifting state.

At block 303, the mobile terminal analyzes a first expression of the first user-facial image and determines a first target lock-screen wallpaper type-set corresponding to the first expression based on a correspondence between expressions and lock-screen wallpaper type-sets.

At block 304, the mobile terminal lights up a screen of the mobile terminal, enters a lock-screen interface, and displays a first lock-screen wallpaper on the lock-screen interface. The first lock-screen wallpaper is one selected from the first target lock-screen wallpaper type-set.

At block 305, the mobile terminal enters a reading interface of the first lock-screen wallpaper when detecting a reading instruction for the first lock-screen wallpaper.

At block 306, the mobile terminal counts a reading duration of the first lock-screen wallpaper.

At block 307, the mobile terminal adds the first lock-screen wallpaper to favorites when the reading duration reaches a preset time period.

In this implementation of the present disclosure, the reading instruction for the first lock-screen wallpaper can be triggered by the user. For example, a "reading" button can be displayed on a display interface of the first lock-screen wallpaper, to guide the user to click the "reading" button to enter the reading interface of the first lock-screen wallpaper, so as to read a detailed interpretation and introduction of the first lock-screen wallpaper, which can help the user to further understand a meaning and a mood expressed by the first lock-screen wallpaper.

When the reading instruction for the first lock-screen wallpaper is detected, it indicates that the user is interested with the first lock-screen wallpaper. After the reading interface of the first lock-screen wallpaper is entered, the time period of the user staying at the reading interface of the first lock-screen wallpaper will be counted and recorded as the reading duration of the first lock-screen wallpaper. Apparently, the longer the reading duration of the first lock-screen wallpaper, the more the user likes the first lock-screen wallpaper. When the reading duration reaches the preset time period, the mobile terminal adds the first lock-screen wallpaper. The favorites are configured to collect lock-screen wallpapers that the user likes. The preset time period can be set in advance and stored in a non-transitory memory of the mobile terminal. For example, the preset time period can be set to 5 seconds.

Operations at block 301 to block 304 in the implementation illustrated in FIG. 3 may refer to operations at block 101 to block 104 illustrated in FIG. 1, which will not be described in detail herein again.

By means of the method illustrated in FIG. 3, whether the user likes the first lock-screen wallpaper can be judged according to whether the user enters the reading interface of the first lock-screen wallpaper and the reading duration of reading the first lock-screen wallpaper, which can intelligently measure user's preferences for the lock-screen wallpaper and collect the favorite lock-screen wallpapers of the user, thereby improving the user experience.

The foregoing technical solutions of the implementations of the disclosure are mainly described from the viewpoint of execution of the method. It can be understood that, in order to implement the above functions, the mobile terminal includes hardware structures and/or software modules corresponding to the respective functions. Those skilled in the art should readily recognize that, in combination with the exemplary units and scheme steps or operations described in the implementations disclosed herein, the present disclosure can be implemented in hardware or a combination of hardware and computer software. Whether a function is implemented by way of hardware or computer software driving hardware depends on the particular application and design constraints of the technical solution. Those skilled in the art may use different methods to implement the described functions for each particular application, but such implementation should not be considered as beyond the scope of the present disclosure.

According to the implementations of the disclosure, functional units may be divided for the mobile terminal in accordance with the foregoing method examples. For example, functional units may be divided according to corresponding functions, and two or more functions may be integrated into one processing unit. The above-mentioned integrated unit can be implemented in the form of hardware or software functional units. It should be noted that the division of units in the implementations of the present disclosure is schematic and is merely a logical function division; there may be other division manners in actual implementation.

Figure 4:
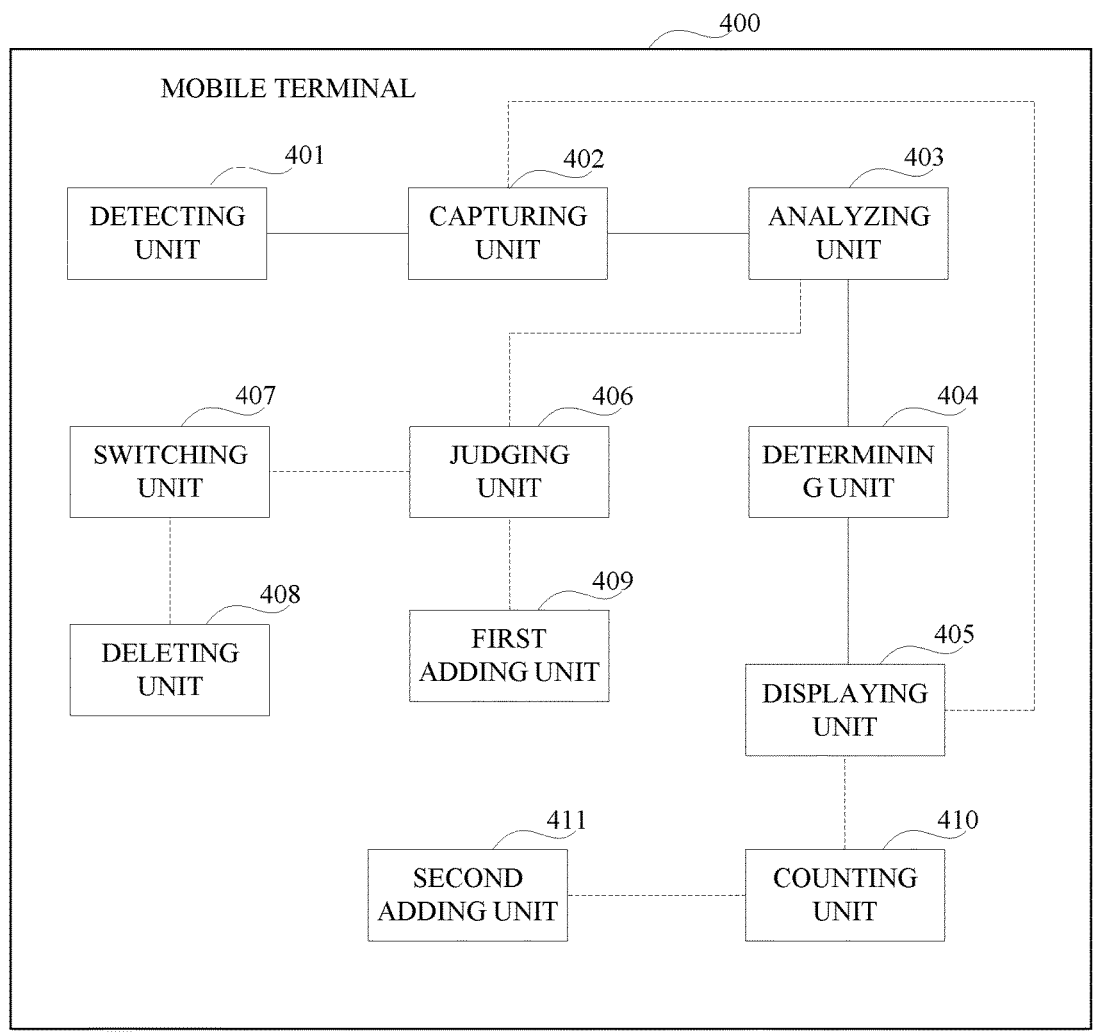
FIG. 4 is a schematic structural diagram illustrating a mobile terminal according to an implementation of the present disclosure.

Referring to FIG. 4, FIG. 4 is a schematic structural diagram illustrating a mobile terminal according to an implementation of the present disclosure. As illustrated in FIG. 4, the mobile terminal 400 can include a detecting unit 401, a capturing unit 402, an analyzing unit 403, a determining unit 404, and a displaying unit 405.

The detecting unit 401 is configured to detect, by a gesture sensor, whether a mobile terminal is in a preset lifting state.

The capturing unit 402 is configured to activate a front-facing camera and capture a first user-facial image when the detecting unit 401 detects that the mobile terminal is in the preset lifting state.

The analyzing unit 403 is configured to analyze a first expression of the first user-facial image.

The determining unit 404 is configured to determine a first target lock-screen wallpaper type-set corresponding to the first expression based on a correspondence between expressions and lock-screen wallpaper type-sets.

The displaying unit 405 is configured to light up a screen of the mobile terminal, enter a lock-screen interface, and display a first lock-screen wallpaper on the lock-screen interface. The first lock-screen wallpaper is one selected from the first target lock-screen wallpaper type-set.

In one implementation, the mobile terminal 400 can further include a judging unit 406 and a switching unit 407.

The capturing unit 402 is further configured to capture a second user-facial image by the front-facing camera after the first lock-screen wallpaper is displayed on the lock-screen interface by the displaying unit 405.

The analyzing unit 403 is further configured to analyze a second expression of the second user-facial image.

The judging unit 406 is configured to judge whether the second expression is the same as the first expression.

The switching unit 407 is configured to switch the first lock-screen wallpaper displayed on the lock-screen interface to a second lock-screen wallpaper, when the second expression is different from the first expression and the first expression is a positive expression while the second expression is a negative expression.

In one implementation, the second lock-screen wallpaper is one selected from a second target lock-screen wallpaper type-set corresponding to the second expression.

In one implementation, the second lock-screen wallpaper is one selected from the first target lock-screen wallpaper type-set except the first lock-screen wallpaper.

In one implementation, the mobile terminal 400 can further include a deleting unit 408.

The deleting unit is 408 configured to delete the first lock-screen wallpaper from the first target lock-screen wallpaper type-set after the first lock-screen wallpaper displayed on the lock-screen interface is switched to the second lock-screen wallpaper by the switching unit 407.

In one implementation, the mobile terminal 400 can further include a first adding unit 409.

The first adding unit 409 is configured to add the first lock-screen wallpaper to favorites, when the second expression is different from the first expression and the first expression is the negative expression while the second expression is the positive expression.

In one implementation, the switching unit 407 is further configured to switch the first lock-screen wallpaper displayed on the lock-screen interface to a third lock-screen wallpaper, when the second expression is the same as the first expression and both the first expression and the second expression are negative expressions. The third lock-screen wallpaper is any one collected in favorites.

In one implementation, the displaying unit 405 is further configured to remain displaying the first lock-screen wallpaper on the lock-screen interface, when the second expression is the same as the first expression and both the first expression and the second expression are positive expressions.

In one implementation, the mobile terminal 400 can further include a counting unit 410 and a second adding unit 411.

The counting unit 410 is configured to enter a reading interface of the first lock-screen wallpaper when detecting a reading instruction for the first lock-screen wallpaper, and count a reading duration of the first lock-screen wallpaper.

The second adding unit 411 is configured to add the first lock-screen wallpaper to the favorites when the reading duration reaches a preset time period.

Each of the above-mentioned units can be a control circuitry such as storage and processing circuitry. The storage and processing circuitry may include a storage such as a hard disk drive storage, a non-volatile memory (e.g., flash memory or other electrically-programmable-read-only memory configured to form a solid state drive), volatile memory (e.g., static or dynamic random-access-memory), etc. Processing circuitry in the storage and processing circuitry may be used to control the operation of the mobile terminal. The processing circuitry may be based on one or more microprocessors, microcontrollers, digital signal processors, baseband processors, power management units, audio codec chips, application specific integrated circuits, display driver integrated circuits, etc.

The storage and processing circuitry may be used to run software on the mobile terminal such as internet browsing applications, voice-over-internet-protocol (VOIP) telephone call applications, email applications, media playback applications, operating system functions, etc. The software may be used to implement control operations such as image acquisition operations using a camera, ambient light measurements using an ambient light sensors, proximity sensor measurements using a proximity sensor, information display functions implemented using status indicators such as light-emitting-diode status indicators, touch event measurements using a touch sensor, functions associated with displaying information on multiple (e.g., layered) displays, operations associated with performing wireless communications functions, operations associated with gathering and producing audio signals, control operations associated with gathering and processing button press event data, and other functions in the mobile terminal. The above-mentioned units can be disposed integrally or separately.

By means of the mobile terminal illustrated in FIG. 4, a wallpaper matching a user's expression can be recommended for the user on the lock-screen interface when the user lifts the mobile terminal, so as to improve user experience.

Figure 5:
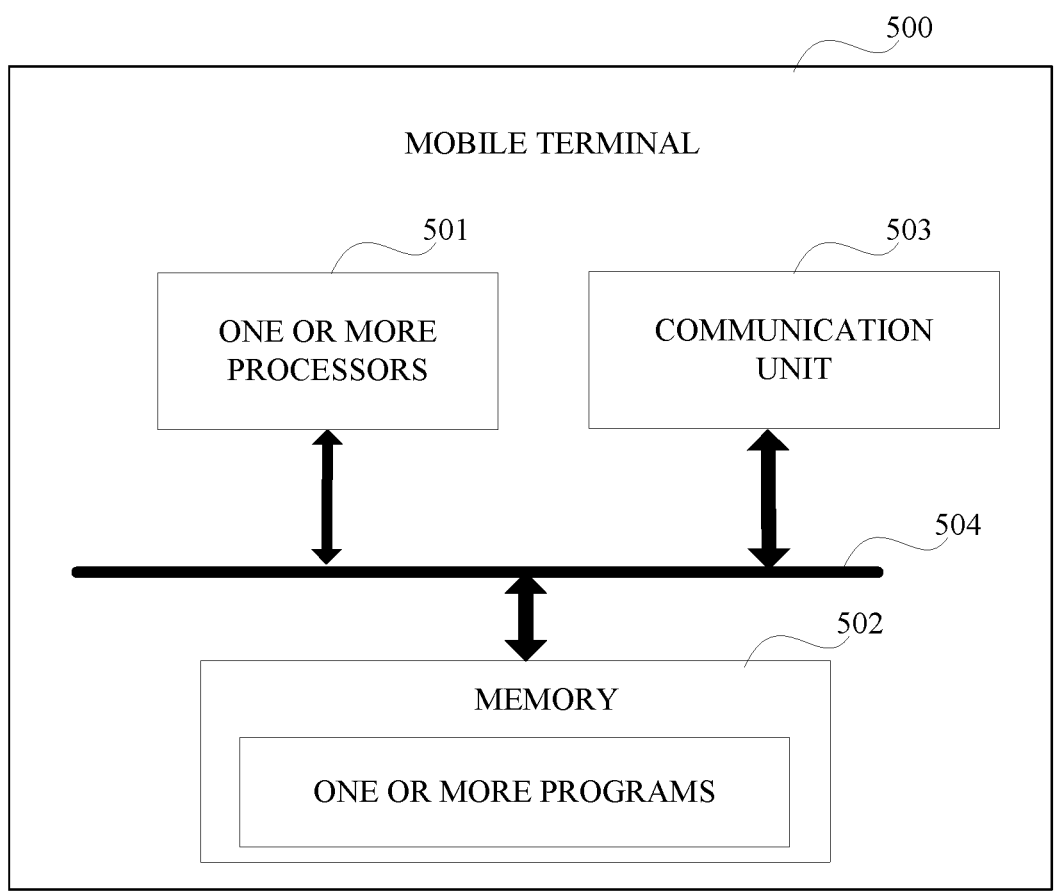
FIG. 5 is a schematic structural diagram illustrating another mobile terminal according to an implementation of the present disclosure.

Referring to FIG. 5, FIG. 5 is a schematic structural diagram illustrating another mobile terminal according to an implementation of the present disclosure. As illustrated in FIG. 5, the mobile terminal 500 includes one or more processors 501, a memory 502, a communication unit 503, and one or more programs. The one or more programs are stored in the memory 502 and include instructions that when executed, become operable with the one or more processors 501 to execute the above-mentioned procedures in FIG. 1 to FIG. 3. The processors 501, the memory 502, and the communication unit 503 can be connected through a communication bus 504.

The communication unit 503 is configured to establish a communication channel, through which the mobile terminal 500 connects with a communication peer or a base-station, and exchange data with the communication peer or the base station. The communication unit 503 can include a wireless local area network (wireless LNA) module, a Bluetooth module, a near field commutation (NFC) module, a baseband module and other wireless communication modules, and an Ethernet, a universal serial bus (USB), a lightning interface and other wired communication modules. The communication unit 503 is configured for communications of each component of the mobile terminal 500 with the communication peer or the base station. The communication unit 503 can support direct memory access.

The processors 501 can merely include a central processing unit (CPU), a digital signal processor (DSP), a graphics processing unit (GPU), or a control chip (such as a baseband chip) of the communication unit 503, or any combination thereof. In the implementations of the present disclosure, the CPU can be a single operation core or include multiple operation cores.

By means of the mobile terminal illustrated in FIG. 5, a wallpaper matching a user's expression can be recommended for the user on the lock-screen interface when the user lifts the mobile terminal, so as to improve user experience.

Figure 6:
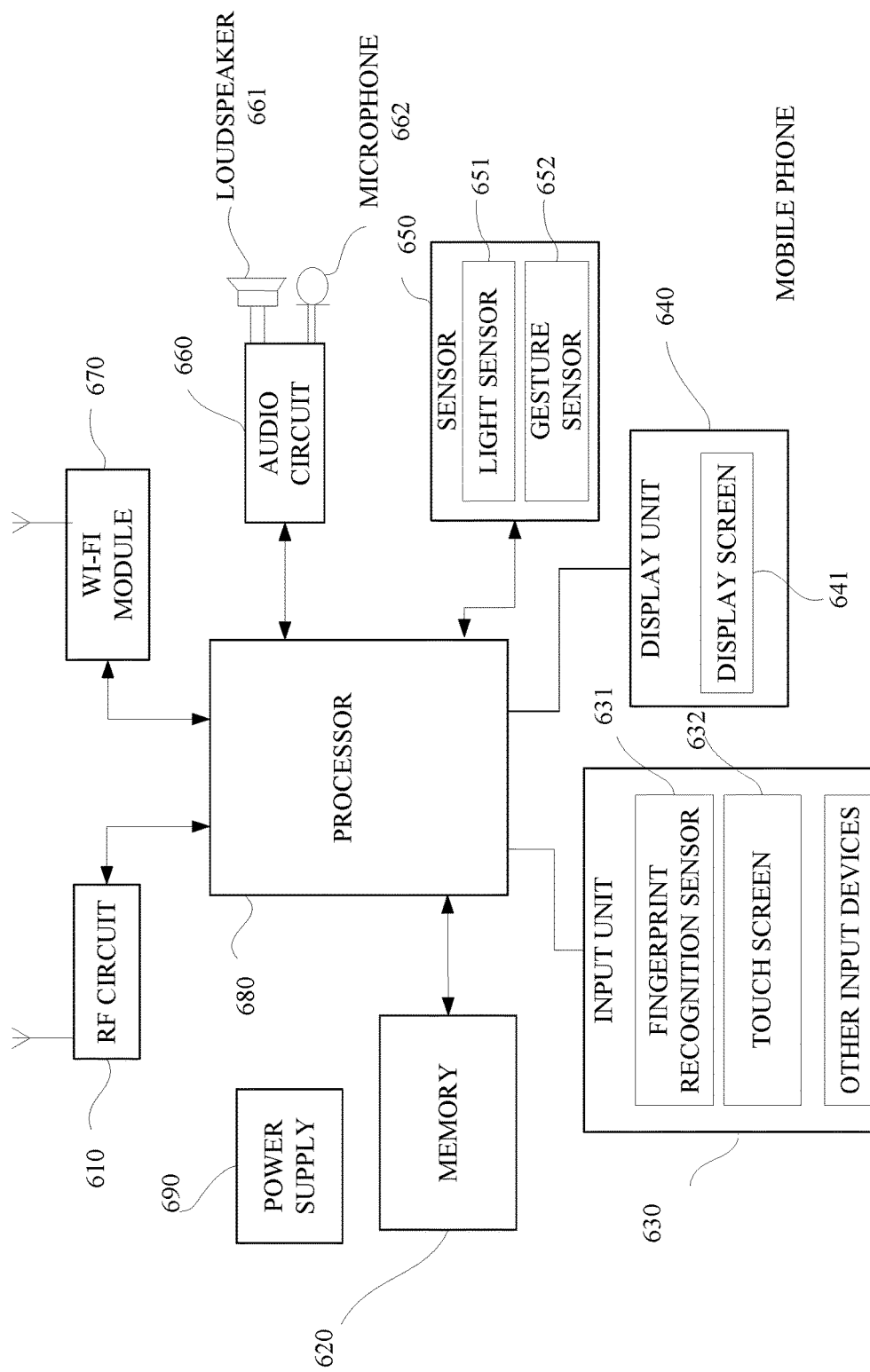
FIG. 6 is a schematic structural diagram illustrating another mobile terminal according to an implementation of the present disclosure.

An implementation of the present disclosure further provides another mobile terminal. As illustrated in FIG. 6, only parts related to the implementations of the present disclosure are illustrated for ease of description. For technical details not described, reference may be made to the method implementations of the present disclosure. The mobile terminal may be any terminal device, such as a mobile phone, a tablet computer, a personal digital assistant (PDA), a point of sale terminal (POS), an on-board computer and the like. The following describes the mobile phone as an example of the mobile terminal.

FIG. 6 is a block diagram of a part of a structure of a mobile phone related to a mobile terminal according to an implementation of the present disclosure. As illustrated in FIG. 6, the mobile phone includes an RF (radio frequency) circuit 610, a memory 620, an input unit 630, a display unit 640, a sensor 650, an audio circuit 660, a Wi-Fi (wireless fidelity) module 670, a processor 680, a power supply 690 and other components. Those skilled in the art can understand that the structure of the mobile phone illustrated in FIG. 6 does not constitute any limitation on a mobile phone. The mobile phone configured to implement technical solutions of the disclosure may include more or fewer components than illustrated or may combine certain components or different components.

In the following, various components of the mobile phone will be described in detail with reference to FIG. 6.

The RF circuit 610 may be configured to receive and transmit information. Generally, the RF circuit 610 includes, but is not limited to, an antenna, at least one amplifier, a transceiver, a coupler, a Low Noise Amplifier (LNA), a duplexer and on the like. In addition, the RF circuit 610 may further communicate with other devices via wireless communication and a network. The wireless communication may use any one communication standard or protocol, including, but not limited to, Global System of Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS) and so on.

The memory 620 may be configured to store software programs and modules, and the processor 680 executes various function applications and data processing of the mobile phone by running the software programs and the modules stored in the memory 620. The memory 620 may mainly include a program storage region and a data storage region, the storage program region may store an operation system, application programs needed for at least one function (a power manager service (PMS) wake-up function, a fingerprint data acquisition function, a feature point matching function, and a display lighting function) and so on; and the data storage region may store data (such as fingerprint data obtained by a fingerprint recognition sensor, pre-stored preset quick unlocking period, statistical information of screen-off unlocking period and so on) created according to use of the mobile phone. In addition, the memory 620 may include a high-speed RAM, and may further include a non-volatile memory such as one of at least a disk storage device, a flash device, or other non-volatile solid storage devices.

The input unit 630 may be configured to receive input digital or character information and generate key signal input associated with user setting and functional control of the mobile phone. As one implementation, the input unit 630 may include a fingerprint sensor 631, a touch screen 632, and other input devices 633. The fingerprint sensor 631 may collect fingerprint data of a user thereon. The input unit 630 may further include other input devices 633. As one implementation, the other input devices 633 may include, but not limited to, one or more of a touch screen, a physical key, a function key (such as a volume control key, a switch key, etc.), a trackball, a mouse, a joystick and the like.

The display unit 640 may be configured to display information input by the user or information provided for the user or various menus of the mobile phone. The display unit 640 may include a display screen 641, and alternatively, the display screen 641 may be configured in the form of a Liquid Crystal Display (LCD), an Organic Light-Emitting Diode (OLED) and so on. Although the fingerprint sensor 631 and the display screen 641 are illustrated as two separate components in FIG. 6 to realize the input and output functions of the mobile phone, in some implementations, the fingerprint sensor 631 may be integrated with the display screen 641 to implement the input and output functions of the mobile phone.

The mobile phone may further include at least one sensor 650, such as a light sensor 651, a gesture sensor 652, and other sensors. Specifically, the light sensor may include an ambient light sensor and a proximity sensor; the ambient light sensor may adjust the luminance of the display screen 641 according to the brightness of ambient light, and the proximity sensor may turn off the display screen 641 and/or backlight when the mobile phone reaches nearby the ear. As a kind of motion sensor, an accelerometer sensor may detect the magnitude of an accelerated speed in each direction (generally, three-axis); when stationary, the accelerometer sensor can detect the magnitude and direction of a gravity; the accelerometer sensor may be configured to identify an application of a mobile phone gesture (e.g., horizontal and vertical screen switching, relevant games, and magnetometer gesture calibration), and vibration recognition related functions (e.g., pedometer and knocking) and the like. Other sensors such as a gyroscope sensor, a barometer sensor, a hygrometer sensor, a thermometer sensor, an infrared sensor, and other sensors configurable for the mobile phone will not be elaborated herein.

The audio circuit 660, a loudspeaker 661, and a microphone 662 may provide an audio interface between the user and the mobile phone. The audio circuit 660 may convert received audio data into electric signals and transmit the electric signals to the loudspeaker 661, and the loudspeaker 661 converts the electric signals into sound signals to output. Besides, the microphone 662 converts collected sound signals into electric signals, the audio circuit 660 receives and converts the electric signals into audio data; the audio data is output to the processor 680 for processing and the processed audio data is transmitted to another mobile phone via the RF circuit 610, or the audio data is output to the memory 620 for further processing.

Wi-Fi belongs to a short-range wireless transmission technology. With aid of the Wi-Fi module 670, the mobile phone may assist the user in E-mail receiving and sending, webpage browsing, access to streaming media and the like. Wi-Fi provides users with wireless broadband Internet access. Although the Wi-Fi module 670 is illustrated in FIG. 6, the Wi-Fi module 670 is not essential to the mobile phone and can be omitted according to actual needs without departing from the essential nature of the present disclosure.

The processor 680 is a control center of the mobile phone, and is configured to connect all parts of the whole mobile phone by utilizing various interfaces and lines, to run or execute the software program and/or the module stored in the memory 620 and call data stored in the memory 620 to execute various functions and processing data of the mobile phone, so as to wholly monitor the mobile phone. Alternatively, the processor 680 may include one or more processing units. The processor 680 may be integrated with an application processor and a modulation-demodulation processor, the application processor mainly processes an operation system, a user interface, an application program and the like, and the modulation-demodulation processor mainly processes wireless communication. It should be understood that the modulation-demodulation processor may not be integrated into the processor 680.

The mobile phone may further include a power supply 690 (such as a battery) for supplying power to each component. The power supply may be connected with the processor 680 logically via a power supply management system, so as to implement functions of charging, discharging, and power consumption management by means of the power supply management system.

The mobile phone may further include a camera, a Bluetooth module and the like, which are not illustrated, and will not be elaborated herein.

The implementations of the present disclosure also provide a computer readable storage medium. The computer readable storage medium stores computer programs for electronic data interchange which, when executed, is operable with a computer to accomplish all or part of the operations of any of the methods for recommending a lock-screen wallpaper described in the above-described method implementation.

The implementations of the present disclosure also provide a computer program product. The computer program product includes a non-transitory computer readable storage medium for storing computer programs. The computer programs are operable with a computer to perform all or part of the operations of any of the methods for recommending a lock-screen wallpaper described in the above method implementations.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be an electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or compact disc (CD), and so on.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for recommending a lock-screen wallpaper, comprising:
   detecting, by a gesture sensor, whether a mobile terminal is in a preset lifting state;
   activating a front-facing camera and capturing a first user-facial image when the mobile terminal is in the preset lifting state;
   analyzing a first expression of the first user-facial image and determining a first target lock-screen wallpaper type-set corresponding to the first expression based on a correspondence between expressions and lock-screen wallpaper type-sets; and
   lighting up a screen of the mobile terminal, entering a lock-screen interface, and displaying a first lock-screen wallpaper on the lock-screen interface, wherein the first lock-screen wallpaper is one selected from the first target lock-screen wallpaper type-set.

2. The method of claim 1, further comprising:
   after the displaying the first lock-screen wallpaper on the lock-screen interface, capturing a second user-facial image by the front-facing camera;
   analyzing a second expression of the second user-facial image;
   judging whether the second expression is the same as the first expression; and
   switching the first lock-screen wallpaper displayed on the lock-screen interface to a second lock-screen wallpaper, when the second expression is different from the first expression and the first expression is a positive expression while the second expression is a negative expression.

3. The method of claim 2, wherein the second lock-screen wallpaper is one selected from a second target lock-screen wallpaper type-set corresponding to the second expression, or the second lock-screen wallpaper is one selected from the first target lock-screen wallpaper type-set except the first lock-screen wallpaper.

4. The method of claim 2, further comprising:
after the switching the first lock-screen wallpaper displayed on the lock-screen interface to the second lock-screen wallpaper, deleting the first lock-screen wallpaper from the first target lock-screen wallpaper type-set.

5. The method of claim 2, further comprising:
adding the first lock-screen wallpaper to favorites, when the second expression is different from the first expression and the first expression is the negative expression while the second expression is the positive expression.

6. The method of claim 2, further comprising:
switching the first lock-screen wallpaper displayed on the lock-screen interface to a third lock-screen wallpaper, when the second expression is the same as the first expression, and both the first expression and the second expression are negative expressions, wherein the third lock-screen wallpaper is any one collected in favorites.

7. The method of claim 2, further comprising:
remaining displaying the first lock-screen wallpaper on the lock-screen interface, when the second expression is the same as the first expression, and both the first expression and the second expression are positive expressions.

8. The method of claim 1, further comprising:
after the displaying the first lock-screen wallpaper on the lock-screen interface, entering a reading interface of the first lock-screen wallpaper when detecting a reading instruction for the first lock-screen wallpaper;
counting a reading duration of the first lock-screen wallpaper; and
adding the first lock-screen wallpaper to favorites when the reading duration reaches a preset time period.

9. A mobile terminal, comprising:
one or more processors, a memory, a communication unit, and one or more programs, wherein the one or more programs are stored in the memory and comprise instructions that when executed, become operable with the one or more processors to:
detect, by a gesture sensor, whether a mobile terminal is in a preset lifting state;
activate a front-facing camera and capturing a first user-facial image when the mobile terminal is in the preset lifting state;
analyze a first expression of the first user-facial image and determining a first target lock-screen wallpaper type-set corresponding to the first expression based on a correspondence between expressions and lock-screen wallpaper type-sets; and
light up a screen of the mobile terminal, enter a lock-screen interface, and display a first lock-screen wallpaper on the lock-screen interface, wherein the first lock-screen wallpaper is one selected from the first target lock-screen wallpaper type-set.

10. The mobile terminal of claim 9, wherein the instructions that when executed, are further operable with the one or more processors to:
capture a second user-facial image by the front-facing camera;
analyze a second expression of the second user-facial image;
judge whether the second expression is the same as the first expression; and
switch the first lock-screen wallpaper displayed on the lock-screen interface to a second lock-screen wallpaper, when the second expression is different from the first expression and the first expression is a positive expression while the second expression is a negative expression.

11. The mobile terminal of claim 10, wherein the second lock-screen wallpaper is one selected from a second target lock-screen wallpaper type-set corresponding to the second expression, or the second lock-screen wallpaper is one selected from the first target lock-screen wallpaper type-set except the first lock-screen wallpaper.

12. The mobile terminal of claim 9, wherein the instructions that when executed, are further operable with the one or more processors to:
delete the first lock-screen wallpaper from the first target lock-screen wallpaper type-set.

13. The mobile terminal of claim 9, wherein the instructions that when executed, are further operable with the one or more processors to:
add the first lock-screen wallpaper to favorites, when a second expression is different from the first expression and the first expression is a negative expression while the second expression is a positive expression.

14. The mobile terminal of claim 9, wherein the instructions that when executed, are further operable with the one or more processors to:
switch the first lock-screen wallpaper displayed on the lock-screen interface to a third lock-screen wallpaper, when a second expression is the same as the first expression, and both the first expression and the second expression are negative expressions, wherein the third lock-screen wallpaper is any one collected in favorites.

15. The mobile terminal of claim 9, wherein the instructions that when executed, are further operable with the one or more processors to:
remain displaying the first lock-screen wallpaper on the lock-screen interface, when a second expression is the same as the first expression, and both the first expression and the second expression are positive expressions.

16. The mobile terminal of claim 9, wherein the instructions that when executed, are further operable with the one or more processors to:
enter a reading interface of the first lock-screen wallpaper when detecting a reading instruction for the first lock-screen wallpaper;
count a reading duration of the first lock-screen wallpaper; and
add the first lock-screen wallpaper to favorites when the reading duration reaches a preset time period.

17. A non-transitory computer readable storage medium, storing computer programs configured for electronic data interchange, wherein when executed, the computer programs become operable with a computer to:
detect, by a gesture sensor, whether a mobile terminal is in a preset lifting state;
activate a front-facing camera and capturing a first user-facial image when the mobile terminal is in the preset lifting state;
analyze a first expression of the first user-facial image and determining a first target lock-screen wallpaper type-set corresponding to the first expression based on a correspondence between expressions and lock-screen wallpaper type-sets; and
light up a screen of the mobile terminal, enter a lock-screen interface, and display a first lock-screen wallpaper on the lock-screen interface, wherein the first lock-screen wallpaper is one selected from the first target lock-screen wallpaper type-set.

18. The non-transitory computer readable storage medium of claim 17, wherein the computer programs, when executed, are further operable with the computer to:
    capture a second user-facial image by the front-facing camera;
    analyze a second expression of the second user-facial image;
    judge whether the second expression is the same as the first expression; and
    switch the first lock-screen wallpaper displayed on the lock-screen interface to a second lock-screen wallpaper, when the second expression is different from the first expression and the first expression is a positive expression while the second expression is a negative expression.

19. The non-transitory computer readable storage medium of claim 18, wherein the computer programs, when executed, are further operable with the computer to:
    add the first lock-screen wallpaper to favorites, when the second expression is different from the first expression and the first expression is the negative expression while the second expression is the positive expression.

20. The non-transitory computer readable storage medium of claim 17, wherein the computer programs, when executed, are further operable with the computer to:
    enter a reading interface of the first lock-screen wallpaper when detecting a reading instruction for the first lock-screen wallpaper;
    count a reading duration of the first lock-screen wallpaper; and
    add the first lock-screen wallpaper to favorites when the reading duration reaches a preset time period.

\* \* \* \* \*